United States Patent [19]
Wang

[11] Patent Number: 5,661,535
[45] Date of Patent: Aug. 26, 1997

[54] EYEGLASSES ADJUSTABLE IN WEARING ANGLE

[76] Inventor: Lee Tzu-Feng Wang, P.O. Box 90, Tainan 704, Taiwan

[21] Appl. No.: 698,239

[22] Filed: Aug. 15, 1996

[51] Int. Cl.⁶ .................................................. G02C 1/02
[52] U.S. Cl. ........................ 351/120; 351/110; 351/111
[58] Field of Search .................................. 3351/120, 110,
3351/111, 118, 119, 115, 140, 41; 2/448, 426

[56] References Cited

U.S. PATENT DOCUMENTS 5,357,292  10/1994  Wiedner ................................ 351/105
5,592,242   1/1997  Ooie ....................................... 351/110

*Primary Examiner*—Hung X. Dang
*Attorney, Agent, or Firm*—Bacon & Thomas

[57] ABSTRACT

A pair of eyeglasses adjustable in wearing angle includes a lens body with two side walls extending rearward, two connecters fixed movably with two sides of the lens body, and two temples fixed with the two connecters in such a way that angles of the temples to the lens body can be adjusted so as to enable this eyeglasses worn by persons having differently sized faces.

1 Claim, 3 Drawing Sheets

1

EYEGLASSES ADJUSTABLE IN WEARING ANGLE

BACKGROUND OF THE INVENTION

This invention concerns a pair of eyeglasses adjustable in wearing angle, particularly having its temples adjustable their angles relative to a lens body so as to permit this eyeglasses wearable by persons having differently sized faces.

Common eyeglasses are made with their temples having their angles relative to a lens body unchangeable. However, different persons have differently sized faces, so to get a pair of eyeglasses suitable to a person is not easy, as the size of a lens body and the length of temples have to be proper to the person. Maybe a pair of eyeglasses change its configuration by friction or collision with other objects in wearing, without possibility of adjusting it by a wearer himself in case of deformation.

SUMMARY OF THE INVENTION

This invention has been devised to offer a pair of eyeglasses adjustable in wearing angle so as to enable it worn by various persons of differently sized faces.

The main feature of the present invention is two connecters provided between two sides of a lens body and two temples. The connecters made of plastic are respectively fixed movably with the two side walls of the lens body and fixed firmly with the two temples. Each connecter has a small pin extending sidewise from one of two vertical parallel walls to fit in one of a plurality of position holes continually abutting with each other bored vertically in an intermediate portion of each of the two side walls of the lens body. A forward projection is formed extending from a closed rear side of the two vertical parallel walls of each connecter between the two vertical parallel walls to fit in a notch formed in a rear edge of each side wall of the lens body.

BRIEF DESCRIPTION OF DRAWINGS

This invention will be better understood by reference to the accompanying drawings, wherein.

DESCRIPTION OF THE PREFERRED EMBODIMENT

Figure 1:
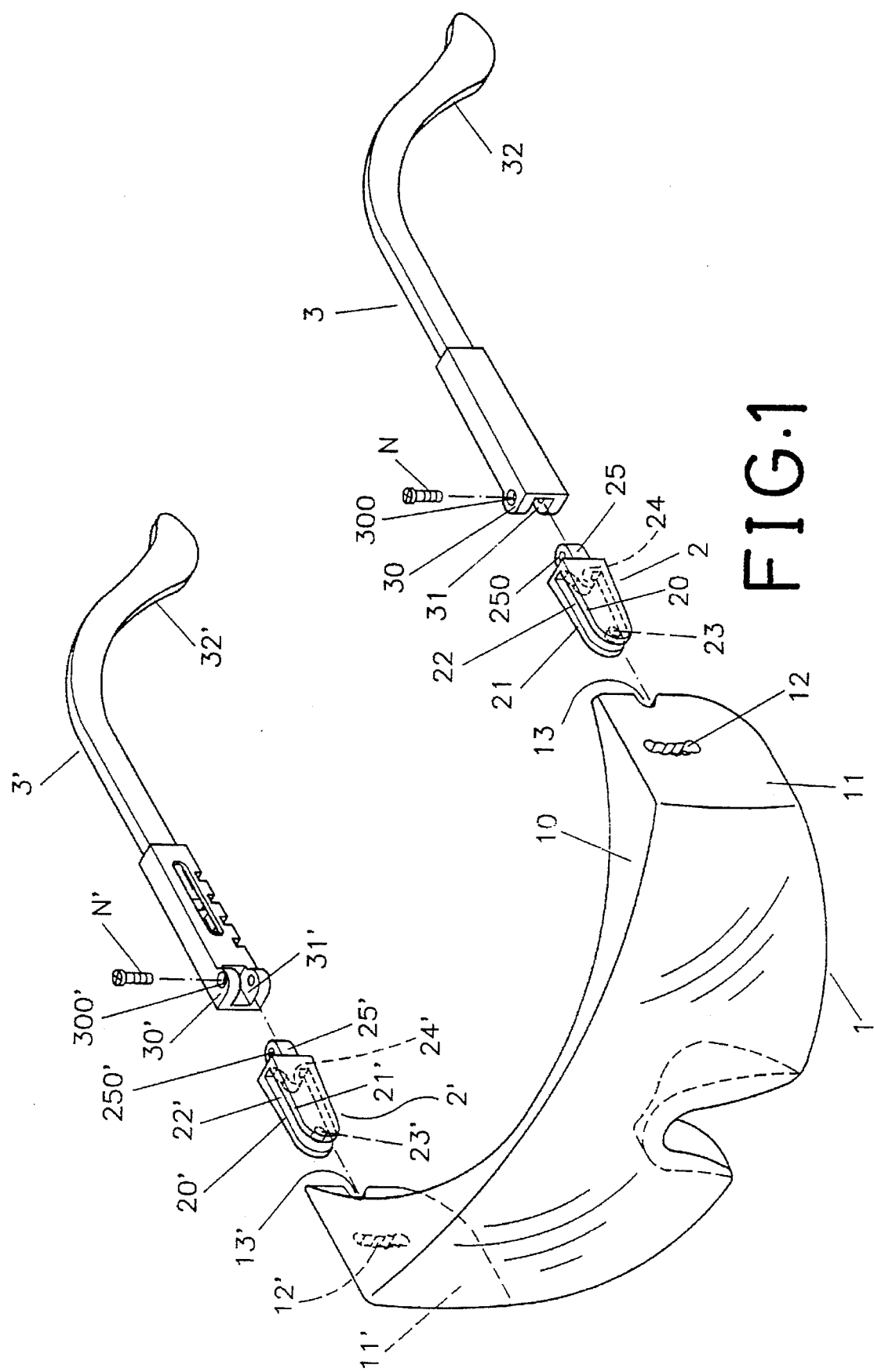
FIG. 1 is an exploded perspective view of a pair of eyeglasses adjustable in wearing angle in the present invention.

A pair of eyeglasses adjustable in wearing angle in the present invention, as shown in FIG. 1, includes a lens body 1, two connectors 2, 2' and two temples 3, 3' combined together.

The lens body 1 has an upper side 10 formed integral with the lens body 1 and extending rearward from an upper portion of the lens body 1, two side walls 11, 11' formed integral with the lens body 1 and extending rearward from two—right and left—ends of the lens body 1. The two side walls 11, 11' respectively have a plurality of continual position holes 12, 12' provided in an intermediate portion and a notch 13, 13' in a vertical rear edge.

The two connectors 2, 2' are made of plastics, respectively having two vertical parallel walls 20, 21, 20', 21' a center aperture 22, 22' defined by the two vertical parallel walls 20, 21, 20', 21', a small pin 23, 23' laterally provided to extend sidewise from one of the two parallel walls 20, 21, 20', 21 a projection 24 provided between the two parallel walls 20, 21', 20', 21' and extending forward from a closed rear side of the two parallel walls 20, 21, 20', 21', and ear 25, 25' with a vertical center hole 250 extending rearward from the closed rear side of the two walls 20, 21, 20', 21' The small pins 23, 23' respectively fit in one of the continual holes 12, 12' of the two side walls 11, 11' of the lens body 1, and the projections 24, 24' respectively fit in the notches 13, 13' of the two sides 11, 11'.

The two temples 3, 3' respectively have a front end formed with a connecting means 30, 30' and a curved rear end 32, 32' Each connecting means 30, 30' has a center groove 31, 31' opening to an inner side, and a vertical screw hole 300, 300'. The center groove 31, 31' respectively fit with the ears 25, 25' of the connecters 2, 2' when the temples 3, 3' are combined with the connecters 2, 2'.

Figure 2:
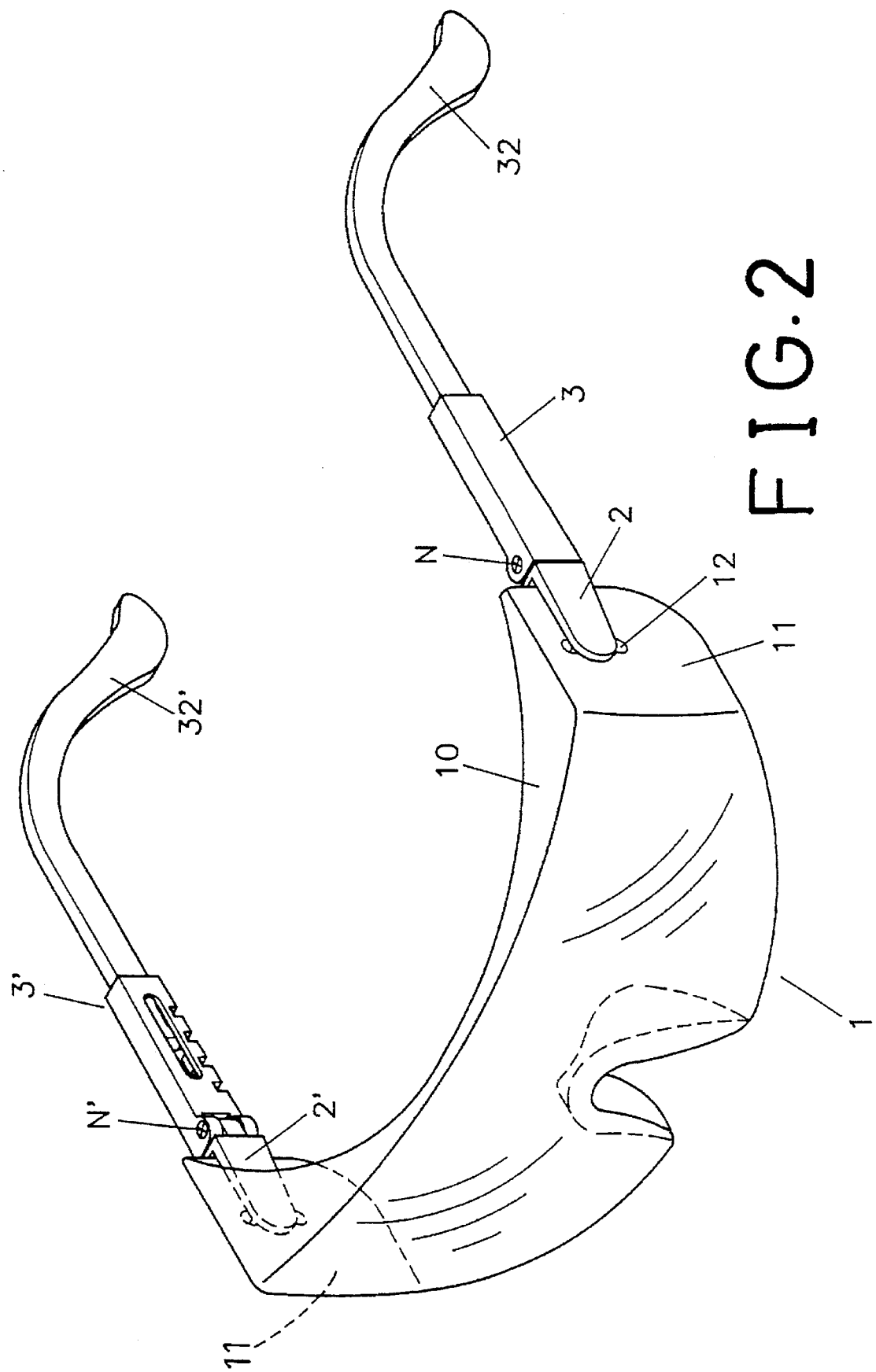
FIG. 2 is a perspective view of the pair of eyeglasses adjustable in wearing angle in the present invention.
Figure 3:
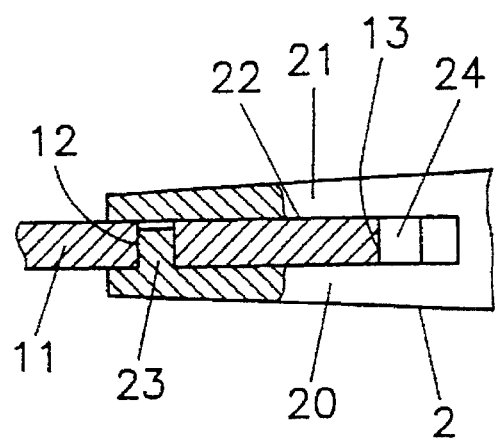
FIG. 3 is a cross-sectional view of a connecter connected with a lens body in the pair of eyeglasses adjustable in wearing angle in the present invention; and, FIG. 4 is a side view of a temple adjusted in its angle relative to the lens body in the present invention.

In combining, referring to FIGS. 1 and 2, firstly, the two parallel walls 20, 21, 20, 21' of the connecters 2, 2' are stretched outward, as they are flexible made of plastics, letting the two side walls 11, 11' of the lens body 1 insert in the apertures 22, 22' of connecters 2, 2' until the small pins 23, 23' respectively fit in one of the continual holes 12, 12' and the projections 24, 24' respectively fit in the notches 13, 13', as shown in FIG. 3. Then the the lens body 1 and the connecters 2, 2 are securely combined together. Next, the connecting means 30, 30' of the two temples 3' are respectively made to engage with the ears of the connecters 2, 2' with the holes 250, 250' aligned to the holes 300, 300' and with screws N, N engageing those holes 250, 250', 300 300' completing assemblage of this eyeglasses adjustable in wearing angle.

Figure 4:
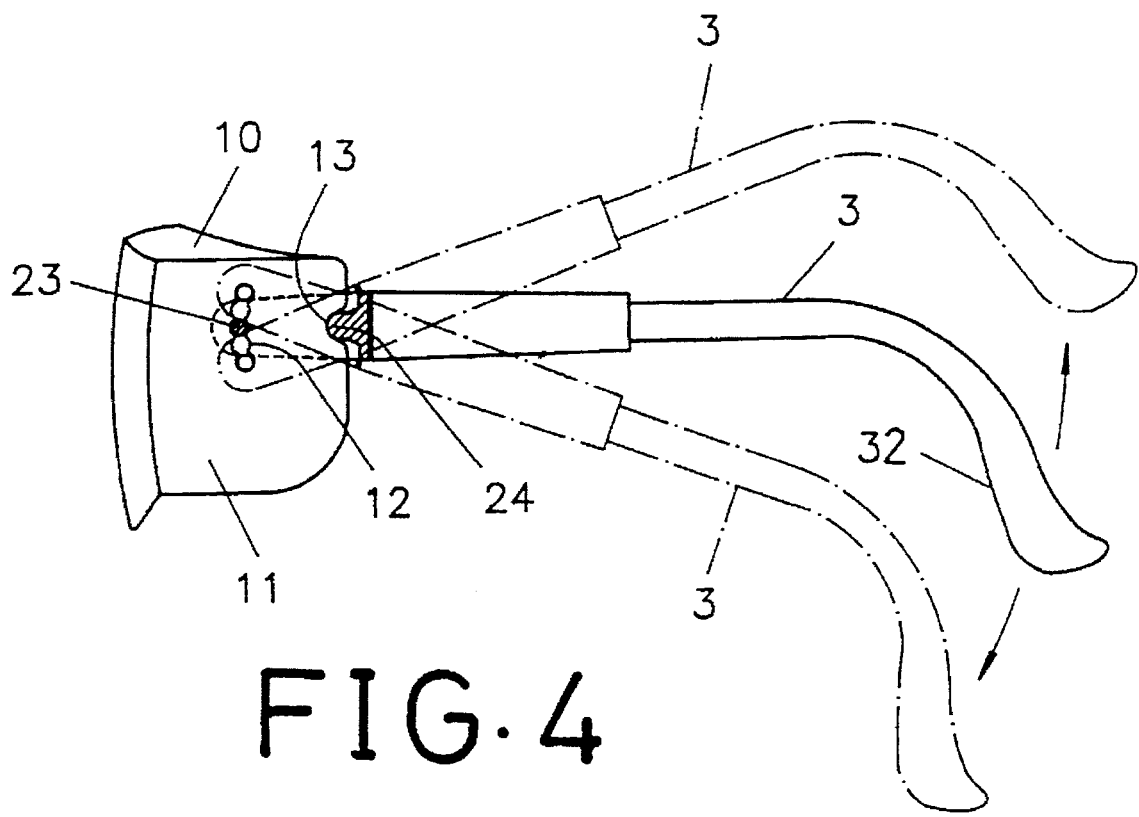

In using, referring to FIG. 4, the two temples 3, 3' are adjusted in its angle relative to the lens body by a wearer, by means of changeable engagement of the small pins 23, 23' with one of the continual holes 12, 12' and constant engagement of the projections 24, 24' with the notches 13, 13' functioning as fulcrums. Then the front ends of the two connecters 2, 2' are able to be adjusted to move up and down, enabling the two temples adjusted in their angles relative to the lens body 1. Or the lens body 1 can be moved for changing the angles of the two temples 3, 3' relative to the lens body 1, with the latter not moved. Therefore, this pair of eyeglasses can be adjusted to suit to various wearers having differently sized faces by changing the angles of the two temples relative to the lens body 1.

As can be understood from the description, this invention has following advantages.

1. It can be worn comfortably with adjustable angles of the temples relative to the lens body.

2. It can be adjusted even if it should be deformed by careless friction or collision with other objects in sports.

3. It has a simple structure, easy to assemble.

While the preferred embodiment of the invention has been described above, it will be recognized and understood that various modifications may be made therein and the appended claims are intended to include all such modifications which may fall in the spirit and scope of the invention.

What is claimed is:

1. A pair of eyeglasses adjustable in wearing angle comprising:

a lens body having two, right and left, side walls extending rearward;

two connecters respectively fixed movably with said two side walls of said lens body;

two temples respectively fixed firmly with said two connecters; and, characterized by said two side walls respectively having a plurality of position holes continually abutting one another vertically in an intermediate portion and a notch in a vertical rear edge, by said two connecters made of plastics and having two, right and left, vertical parallel walls separated by a center aperture, by one of said vertical parallel wall having a sidewise pin in said center aperture near a front end to fit in any of said position holes of said two side walls, by said vertical parallel walls respectively having a forward projection formed to extend from a rear closed end wall to fit in said notch of said two side walls so as to function as a fulcrum, by said sidewise pins respectively being adjusted to engage with any of said position holes of said side walls of said lens body so that an angle of said two temples relative to said lens body may be adjusted so as to enable said eyeglasses worn by persons having differently sized faces.

* * * * *